(12) United States Patent
Ruigrok

(10) Patent No.: US 7,245,562 B2
(45) Date of Patent: Jul. 17, 2007

(54) METHOD AND DEVICE FOR HIGH-SPEED MAGNETIC RECORDING

(75) Inventor: Jacobus Josephus Maria Ruigrok, Asten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 10/647,823

(22) Filed: Aug. 25, 2003

(65) Prior Publication Data
US 2005/0047283 A1    Mar. 3, 2005

(51) Int. Cl.
*G11B 11/00* (2006.01)
(52) U.S. Cl. .................. 369/13.14; 369/13.33
(58) Field of Classification Search ............. 369/13.02, 369/13.06, 13.09, 13.14, 13.15, 13.24, 13.32, 369/13.33; 428/694 EC, 694 ML
See application file for complete search history.

(56) References Cited

U.S. PATENT DOCUMENTS 6,665,235 B2 * 12/2003 Murakami et al. ....... 369/13.06
6,830,824 B2 * 12/2004 Kikitsu et al. ........... 428/828.1

OTHER PUBLICATIONS

Jaap Ruigrok, "Prospects for Thermally-Assisted Recording", TMRC-NIST-CMU-Seagate Ext. Sep. 3, 2002, pp. 1-49.

* cited by examiner

*Primary Examiner*—Ali Neyzari
(74) *Attorney, Agent, or Firm*—Michael E. Belk

(57) ABSTRACT

The invention provides a method for recording information in the form of a pattern of magnetic domains in a recording layer. The recording layer includes a material having a Curie temperature and grains, the grains having boundaries over which the exchange coupling is small. The method includes a first step of applying heat to the material, thereby heating an area of the recording layer to a temperature above the Curie temperature during a first interval. In a second step a magnetic field is applied to the area during a second interval, the second interval ending after the first interval.

6 Claims, 4 Drawing Sheets

METHOD AND DEVICE FOR HIGH-SPEED MAGNETIC RECORDING

BACKGROUND

The invention relates to a method for recording information in the form of magnetic domains in a material, a recording device for carrying out the method and an antenna structure for use in the recording device.

Conventional magnetic recording, such as hard-disk recording, uses a magnetic field to write magnetic domains in a material, the domains representing information recorded. The material used in this type of magnetic recording is usually a sputtered ferromagnetic film and has typically a granular structure. The remanent magnetization is typically high. The domains are being read using a magnetic head. In general, the size of the grains is of the order of $(10 nm)^3$ and the thickness of the recording layer in which the grains are embedded is also of the order of some tens of nm or less. The exchange coupling over the boundaries of the grains is small. The preferred magnetization orientation is usually longitudinal.

A different type of magnetic recording is magneto-optical recording, in which domains are recorded using a light beam to heat the recording layer and a magnetic field small compared to the write fields used in conventional hard disk recording to orient the magnetisation of the recording layer at the increased temperature close to the Curie temperature where the coercivity is sufficiently low to allow a magnetization reversal in the relatively small write field and are read using an incident light beam whose reflected beam is modulated by the perpendicular magnetization due to the Kerr effect. The magnetization is typically low compared to the magnetization common in hard-disk recording. Magneto-optical recording does not use granular material but a magnetically-continuous amorphous material in which there is a long-range exchange coupling between the spins of the material, the range extending well over a 100 nm. The preferred magnetization orientation is usually perpendicular. Activation volumes in MO media take over the role of the grains in granular media. Magneto-optical media are typically made of TbFeCo or GdFeCo ferrimagnetic layers, optimised to the Kerr effect and not to a strong remanence.

For high density media in conventional magnetic recording, small grains are necessary to avoid excessive medium noise. However, the magnetization state of grains considerably smaller than $(10 nm)^3$ is not stable over a sufficiently-long period. The instability can be avoided by increasing the coercivity of the media. For a strong increase of the density, the coercivity must be made so high that write fields need to be higher than can practically be realized. In thermally-assisted recording, also called heat-assisted magnetic recording (HAMR), the necessity of a high write field in a very-high coercivity medium is circumvented by increasing the temperature temporarily and thereby reducing the coercivity strongly at the location where the write field is active and the recording is taking place. It is noted that the coercivity of most materials decreases with increasing temperature. When the recording material has cooled down to room temperature after the recording process, the coercivity will be high again, providing a long-term stability of the written domain. This so-called thermally assisted recording is described in the article "Limits of conventional and thermally-assisted recording" by Jaap J. M. Ruigrok, J. Magn. Soc. Japan, 25, pp. 313–321 (2001). For very-high recording speed, i.e. magnetic field switching times well below 1 ns, another limiting factor arises, which is almost independent of the static (low speed) value of the coercivity. This limit is stated as follows, see the above cited article: the product of the time required for switching the magnetisation of a domain and the applied magnetic field cannot exceed a certain constant value, which value depends on the gyromagnetic ratio, which in turn is (almost) a physical constant. Hence, when decreasing the duration of the magnetic pulse, the magnetic field strength applied to the magnetic material during the pulse must be increased. For a field pulse far below 1 ns, the write field must be well above 800 kA/m (1 Tesla) and becomes unrealistic in practice, see e.g. the referenced article. It is explained in this article that the speed limitation also limits the improvement of the information density in thermally-assisted recording.

The disadvantage of the known thermally-assisted and conventional hard-disk recording methods is the relatively long minimum duration of the magnetic field pulse, the relatively high magnetic fields required and the limited density. It is the object of the invention to provide, amongst others, a method for recording at higher speeds and lower fields and a recording device using this method.

The above and following citations are hereby incorporated in whole by reference.

SUMMARY OF THE INVENTION

The object of the invention is achieved if a method for recording information in the form of a pattern of magnetic domains in a material having a Curie temperature and grains having boundaries over which the exchange coupling is small, is characterised in a first step of applying heat to the material, thereby heating an area of the recording layer to a temperature above the Curie temperature during a first interval, and a second step of applying a magnetic field to the area during a second interval, the second interval ending after the first interval. The first interval during which a fixed point in the medium is subjected to heat can be either determined by the length of the heat pulse or by the size of the heated spot in case of a medium moving with a speed relative to the heat source, or by both in case of a moving medium and pulsed heating. The recording method can determine the direction of the magnetization in a series of areas in the recording layer, the areas forming a pattern of domains which may represent recorded information.

The invention is based on a new insight in the magnetisation behaviour around the Curie temperature. When the temperature of the magnetic material is raised above the Curie temperature, the direction of the spins in the material will be in a totally chaotic state. Although the strong ferromagnetic coupling between neighbouring spins still exists, the chaos in direction of the neighbouring spins will cause the average force on a spin to become zero. When a relatively small magnetic field is applied to the material having the chaotic spins state, the isotropic distribution of spin directions will become slightly anisotropic, with a slight preference of spin directions in the direction of the externally applied field. When the material is subsequently cooled to below the Curie temperature, the external magnetic field still being applied, the chaos in spin directions disappears and the ferromagnetic coupling causes the spins to align in the direction of the externally applied field. The fast switching of the magnetisation occurs below the Curie temperature and the energy for the switching is not provided by the externally applied magnetic field, but by the strong ferromagnetic exchange forces. This mechanism allows fast switching at a relatively low external magnetic field.

In a special embodiment for high-speed recording the duration of the first interval is shorter than 1 ns. The duration of the second interval is preferably shorter than 0.3 ns and more preferably shorter than 0.1 ns. At the end of the magnetic field pulse, the material has preferably a temperature of at least 10 degrees below the Curie temperature, thereby providing a proper freezing in of the spin directions in the direction of the external magnetic field.

It should be noted that the article "Capability of Tera bps Ultrafast Rewritable Storage by Thermomagnetic Switching" of Ota et al., Jpn. J. Appl. Phys. Vol. 41, pp. 1650–1653 (2002) discloses a recording method for a magneto-optic record carrier in which the record carrier is heated by a laser. The fast reversal of the magnetization was observed only at a large pump fluence (laser power) for which the maximum obtained temperature was not further specified or indicated. The recording process was regarded as being specific for magneto-optic record carriers having the special characteristics of the magneto-optic recording materials. The insight, which forms the basis of the present invention, revealed that a recording method similar to that of the magneto-optic record carriers could be used for recording media common in the field of computer hard disk drives and that it is essential to heat to above the Curie temperature before cooling down in a field.

A second aspect of the invention relates to a recording device for recording information in the form of magnetic domains in a material having a Curie temperature and grains having boundaries over which exchange coupling is small, the device including a radiation source for supplying a pulsed radiation beam, an optical system for converging the radiation beam to a spot to heat the material to a temperature above the Curie temperature during a first interval, a magnetic head for generating a magnetic field at the location of the spot, a first pulse generator for supplying a first electric pulse signal for controlling the radiation source, a second pulse generator for supplying a second electric pulse signal for energising the magnetic head, a control unit for controlling the first pulse generator and the second pulse generator such that the second electric pulse signal ends after the first interval. Preferably, a near-field antenna for concentrating the electrical field of the light spot further to sub-wavelength dimensions is used. The magnetic head can be any structure for generating the magnetic field, such as a planar coil or a coil wound around a magnetic yoke with a gap. Parts or whole of the antenna structure can be used for generating the magnetic field, too.

In a special embodiment of the recording device the duration of pulses in the second electric pulse signal have a duration shorter than 0.1 ns.

Another aspect of the invention relates to an antenna structure for near-field focussing of a light beam, the structure including an electrically conducting material and having the form of a bow-tie having two wings, wherein each wing forms a current winding by means of a slot in the wing in the length direction of the bow-tie. The length direction is the direction of the electrical polarisation of the light.

Further information is contained in a presentation entitled "Prospects for Thermally-Assisted Recording" by Jaap Ruigrok.

BRIEF DESCRIPTION OF THE DRAWINGS

The advantages of the invention will now be more fully explained with reference to the drawings, in which.

DETAILED DESCRIPTION OF THE INVENTION

Figure 1:
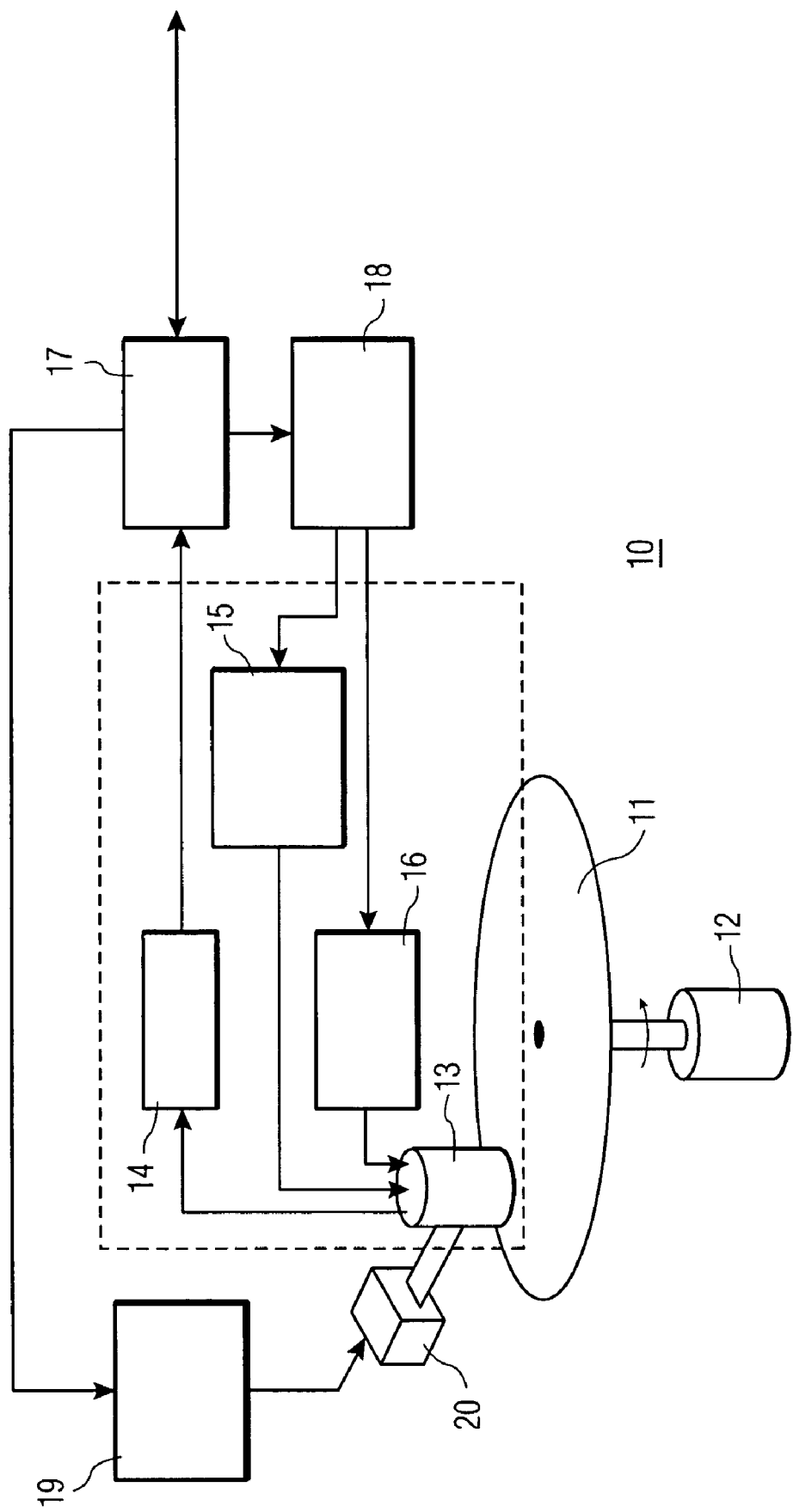
FIG. 1 shows a recording device for carrying out the recording method according to the invention.

FIG. 1 shows a recording device 10 for recording user information according to the invention. A disc-shaped record carrier 11 is rotated by an actuator 12. The record carrier includes a thin recording layer 211 arranged on a substrate 212.

The recording layer consists of a recording material, e.g. CoCrPt, and has a thickness of less than 10 nm. Deposition conditions (underlayer, temperature, type of deposition: sputtered or plated, multi-layer or not, etc.) and composition ratios determine the magnetization and its orientation axis, the coercivity and the temperature dependences of these parameters, the noise characteristics and the thermal stability of magnetic domains written in the recording layer. Preferably, the exchange coupling between the grains is relatively small and the grains are much smaller than $(10 \text{ nm})^3$.

A head 13 in FIG. 1 includes a (not separately shown) read head and write head and an optical head. A receiver 14 is connected to the read head in head 13 and detects the information in the read signal from the read head. A driver 15 controls the magnetic field of the write head and a driver 16 controls the radiation field of the optical head. Preferably elements 14, 15 and/or 16 are integrated with the recording head for optimal high-frequency performance. A processing unit 17 makes the information read from the storage medium available for further use and accepts information to be written onto the record carrier. The processing unit provides a control unit 18 with information for recording information. The control unit controls the two drivers 15 and 16 such that the magnetic field and the radiation field are pulsed in the correct way to record the user information. A control unit 19, provided with information about the actual position of the recording head 13 with respect to the record carrier obtained from the processing unit 17, controls the radial and focus position of the recording head with respect to the record carrier 11 by means of an actuator 20.

The central part of a conventional optical head using a SIL (Solid Immersion Lens) for near-field application is disclosed in for example the article "The Future of Optical Discs: Choosing a Winner" by Ferry Zijp, INSIGHT, p18–20 (edition summer 2002). The head can be mounted on a slider or in an OPU (Optical Pick-up Unit). Another wave-guide type of near-field optical head is shown in the international patent application WO 01/91114, FIGS. 6–18 and the appertaining description. Yet another type of optical head, mentioned in Ruigrok's article for application in thermally-assisted recording, is a near-field antenna structure, a special 'bow-tie' shape of which is shown in the article "Thermally assisted magnetic recording on flux-detectable RE-TM media" by Hirofumi Sukeda et al., IEEE Trans. Magn., 37, 1235–1238 (2001). An integrated read/write head for hybrid recording is proposed in the article "An integrated read/write head for hybrid recording" by T. E. Schlesinger et al., Jpn. J. Appl. Phys. Vol. 41, pp. 1821–1824 (2002).

Figure 2:
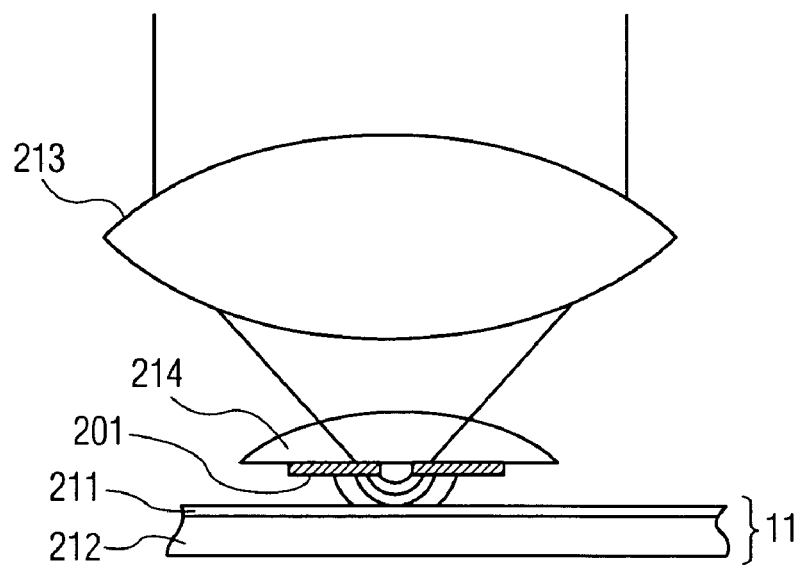
FIG. 2 shows part of the head of the recording device.

FIG. 2 shows details of the head. An objective system comprises a lens 213 and a SIL 214. A near-field antenna structure 201 is arranged below the SIL and is preferably integrated with the SIL.

Figure 3:
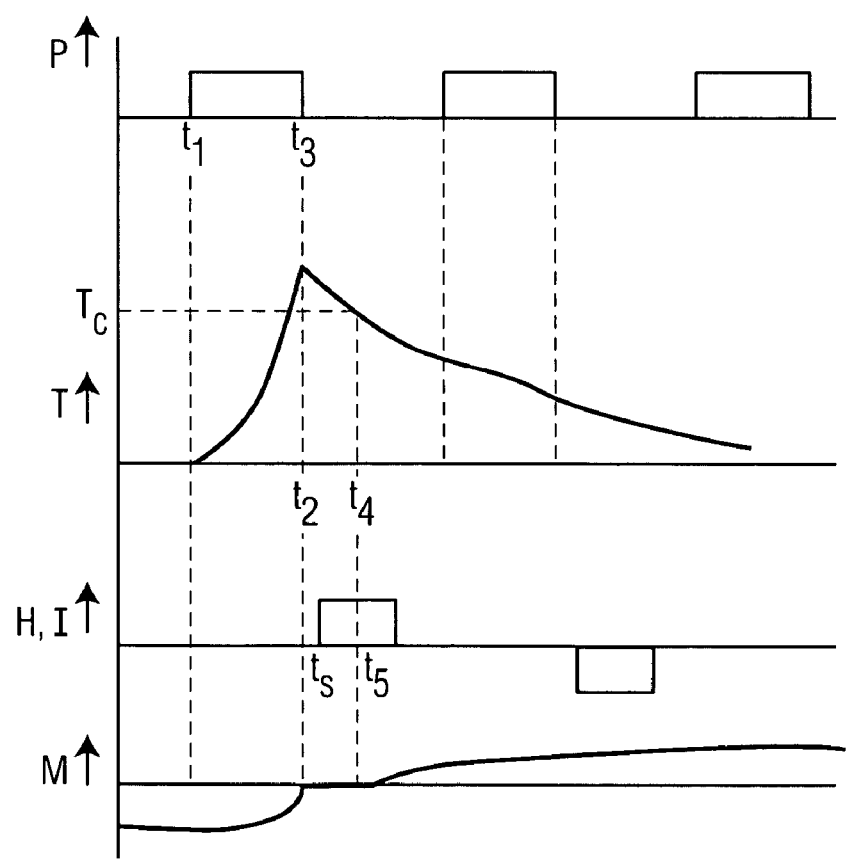
FIG. 3 shows a timing diagram of the magnetic field reversals and the radiation field pulses.

FIG. 3 shows a diagram of the recording process. The vertical axis gives the applied optical heating power P, the temperature T of a fixed point of the moving recording layer, the magnetic field H at a fixed point in space below the magnetic head, and the magnetization M of the recording layer at the point, all in arbitrary units. The horizontal axis gives the time t. The heating power P is applied from time $t_1$ to $t_3$. During this interval the temperature of the point in the recording material increases to above the Curie temperature $T_C$, as indicated in the second trace of the figure. The material has a temperature above the Curie temperature during a first interval $t_2$ to $t_4$. The magnetic field H, caused by a drive current I, is applied during a second interval from $t_S$ to $t_5$. The time $t_S$ may be before $t_2$, or in the first interval when the material has a temperature above the Curie temperature. The traces of the Figure shows the latter case. The magnetic field is switched off or reversed in polarity after $t_4$, at a time $t_5$ when the material has cooled down to a temperature lower than 10 degrees below the Curie temperature. The bottom trace of FIG. 3 shows an initial magnetization M opposite to the direction of the field to be applied during the second interval, which disappears shortly after the point in the recording layer reaches the Curie temperature. The magnetization M grows in the direction of the applied field H shortly after the temperature of the point falls below the Curie temperature.

During the first heating power pulse, the point under consideration has moved into the tiny optical spot, causing the increasing slope in the first part of the temperature curve. At the next heating power pulse, the considered point is already almost completely out of the concentrated light spot and its temperature decay is almost unaffected by the heating.

The duty cycle of the alternating field pulses can be made larger than indicated in the third trace of the figure. A duty cycle of 100% is even possible. The light can also be continuously on, at a slightly reduced power level P, in which case the temperature rise and fall times (slightly) reduce. It is possible to write information in the recording layer 211 initially magnetized in one direction, using a pulsed optical power and a constant magnetic field in a direction opposite to the direction of the initial magnetization.

Figure 4:
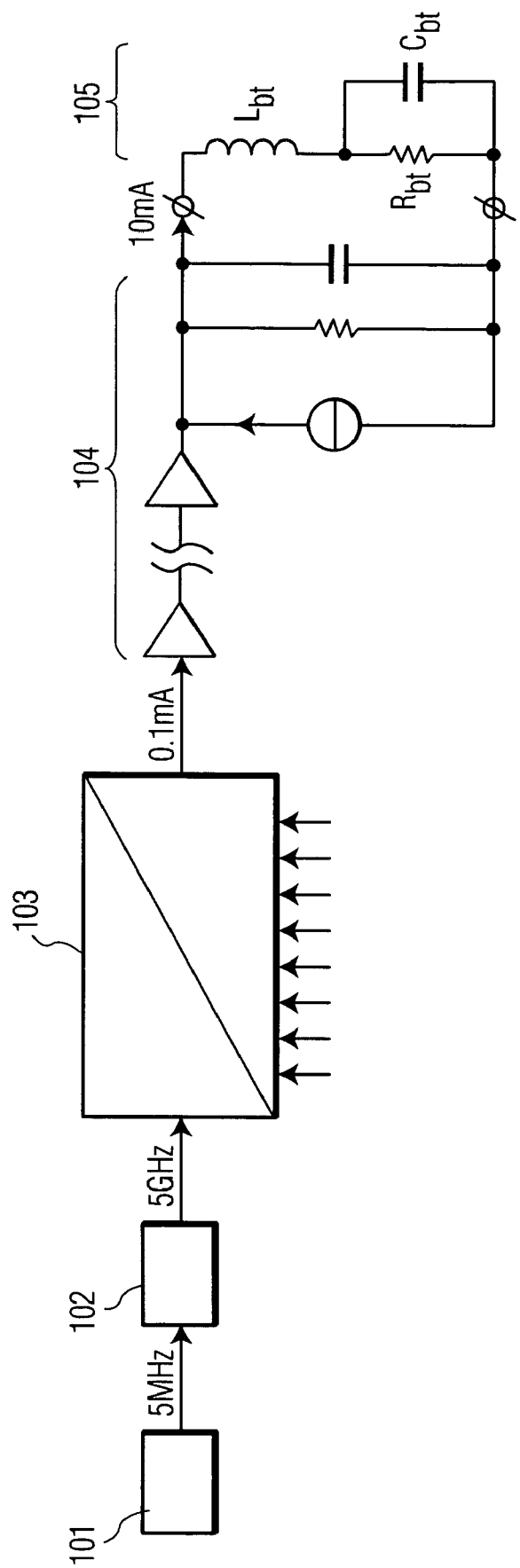
FIG. 4 shows part of the magnetic field driver circuit, and FIGS. 5A and B show a new near-field antenna structure with an adapted bow-tie shape.

FIG. 4 shows part of the magnetic field driver circuit 15. An oscillator 101 operating at 5 MHz and a subsequent phase locked loop 102 locked at a 1000 times higher frequency drives a parallel-serial converter 103 with a clock frequency of 5 GHz. The parallel-serial converter 103 transforms parallel input data to serial output data pulses at the clock rate of 5 GHz. The converter 103 may include a maximum length random sequence generator for test operations. Small-current pulses, for example 0.1 mA, having a duration far below 1 ns can be generated in the standard CMOS12 (0.12 µm, 1.2V or 3.3V) process. The required relatively large driver current is generated by buffer stages, two of which are drawn in the Figure. Relatively strong current pulses require special attention, because of the high input capacity of transistors with high-current capability. This high capacity in combination with the output impedance of the previous transistor stage tends to give rise to a relatively large CR time and hence excessive high-frequency losses. The poor high-frequency performance, due to the large CR time of a single 'power' transistor with its larger input capacity (mainly the drain-source capacitance) fed by a single-transistor source with its large output impedance, is avoided by the gradual decrease of the output impedances and simultaneously gradual increase of the input capacitances of the transistors in the row of buffers 104 which amplify the current to the desired level in the magnetic head 105. The three components $I_{out}$, $R_{out}$ and $C_{out}$ represent the output current, output resistance and output capacitance in the equivalent circuit of the output side of the MOSFET in the last buffer stage. The components $I_{bt}$, $R_{bt}$ and $C_{bt}$ represent the inductance, resistance and capacitance of the bow-tie antenna structure.

Figure 5A:
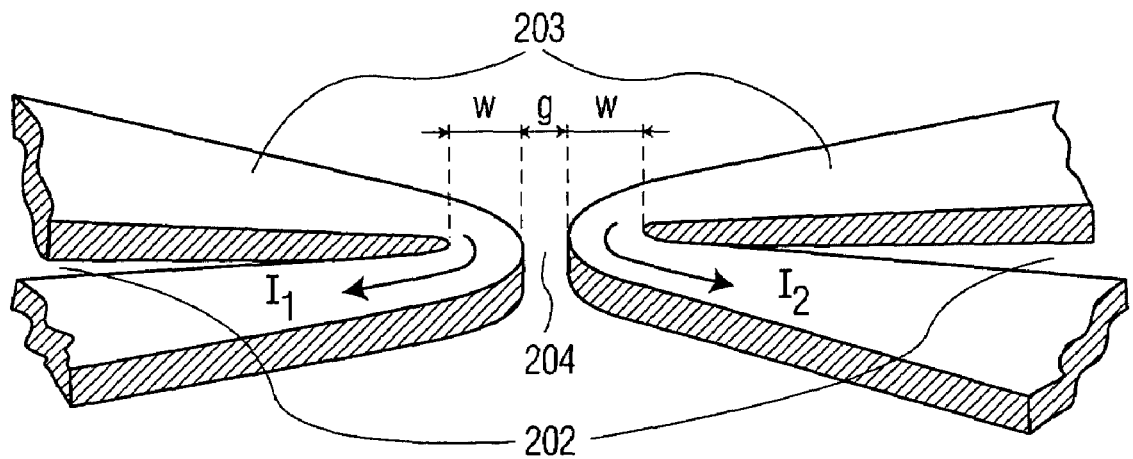
Figure 5B:
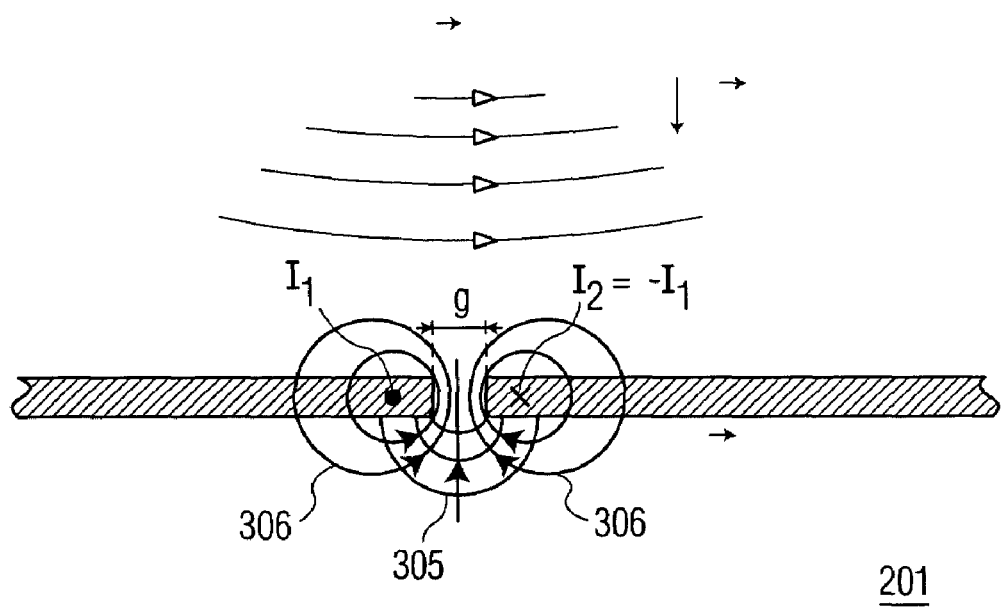

FIG. 5 shows a bow-tie near-field antenna structure 201 according to the invention, both in perspective view (FIG. 4A) and cross-sectional view (FIG. 4B). The antenna structure has a specially adapted bow-tie shape for both the concentration of the light and the generation of a sufficiently strong local magnetic field for initiating the magnetization reversal.

To obtain a concentrated, small optical spot below the bow-tie antenna, it is not necessary to use an incident ultra-violet light beam. Visible light and even infrared light can be used, which have certain technological advantages over ultra violet light. The incident light 302 and the concentrated optical spot 305 are depicted by their electric field lines. $E_{light}$ indicates the polarization direction of the electric field of the light.

A local magnetic field 306, $H_{data}$, modulated by the information or data to be recorded, in and near the gap 204 of the bow-tie appears when currents $I_1$ and $I_2$ flow through the conductors that are formed by the addition of slots 202 parallel to the polarization direction of the incident light 302. This adapted bow-tie preserves the light-concentrating characteristics of the known bow-tie antenna without slots. The magnetic field strength is limited by the maximum current density in the copper conductor, which is of the order of 10–100 MA/cm2. For realistic bow-tie dimensions, i.e. gap between bow-tie halves, thickness of conductors and minimum width W of conductor at the corners, all tens of nm's, fields of a few kA/m can be generated in and near the gap. By increasing the width W of the conductors, much larger fields can be generated. A perpendicular field is generated when the bow-tie halves carry currents in opposite directions ($I_2=-I_1$), as shown in FIG. 4B, and a longitudinal field is generated when the currents are in the same direction ($I_2=I_1$).

The adapted bow-tie has an equivalent electric circuit 105 at the operating data rate with a negligible capacitance ($C_{bt}$<<0.1 pF) and inductance ($L_{bt}$<0.1 nH including integrated connections) and a low resistance ($R_{bt}$ is a few Ohms). The antenna structure is preferably placed on a chip which carries the magnetic field driver 15 or at a very short distance from the chip to avoid too large time constants. A poor high-frequency performance and, consequently, blurred pulses are avoided by these measures. Usually, currents of only a few mA and consequently a few buffer stages will be sufficient for generating the desired magnetic fields of several kA/m. For a drain-to-source current $I_{out}$=10 mA (obtained at the maximal $V_{drain-source}=V_{gate-source}$=1.2 Volt, for an n-channel MOSFET in the CMOS12 process having a channel width of 20 µm and a channel length of 0.13 µm) the output impedance Rout=1 kOhm (the inverse of the MOSFET's output conductance of 1 mA/V), time constants are $L_{bt}/R_{out}$<<1 ps and $C_{bt}R_{bt}$<<1 ps. By far the most relevant time constant in the output circuit of the last buffer is the one due to the last buffer's output resistance $R_{out}$ and output capacitance $C_{out}$ (<0.1 pF) being $C_{out}R_{int}$<100 ps.

Even this most relevant time constant is considerably smaller than the time constant due to the drain-gate capacitances of each buffer transistor in combination with the output impedances of each previous transistor. At present the latter limits the operation of the driver to pulse rates of several GHz when MOSFETS are being used.

Besides the combination of the light and magnetic field concentration and the very good high-frequency performance, the proposed antenna structure has another important advantage: contamination of its surface due to water and other components leaving the recording medium is avoided. Usually, water and other components leave a heated medium when a temperature-reducing cover layer does not protect it. For a near-field antenna structure such a relatively thick protection layer is not preferred. By absorption of power due to the writing current or a comparable current during reading and absorption of part of the light in the antenna structure, the components evaporated at the surface of the recording medium cannot condensate on the surface of the optical head.

What is claimed is:

1. A method for recording information in the form of a pattern of magnetic domains in a recording layer of a material having a Curie temperature and grains, the grains having boundaries over which the exchange coupling is small, the method including
    a first step of applying heat to the material, thereby heating an area of the recording layer to a temperature above the Curie temperature during a first interval, and
    a second step of applying a magnetic field to the area during a second interval, the second interval ending after the first interval.

2. The method of claim 1, wherein the duration of the first interval is shorter than 1 ns.

3. The method of claim 1, wherein the duration of the second interval is shorter than 0.3 ns.

4. The method of claim 1, wherein the temperature of the area at the end of the second interval is more than 10 K below the Curie temperature.

5. A recording device for recording information in the form of magnetic domains in a material having a Curie temperature and grains having boundaries over which the exchange coupling is small, the device including
    a radiation source for supplying a pulsed radiation beam,
    an optical system for converging the radiation beam to a spot to heat the material to a temperature above the Curie temperature during a first interval,
    a magnetic head for generating a magnetic field at the location of the spot,
    a first driver for supplying a first electric pulse signal for controlling the radiation source,
    a second driver for supplying a second electric pulse signal for energising the antenna,
    a control unit for controlling the first driver and the second driver such that a pulse in the second electric pulse signal ends after the first interval.

6. The recording device of claim 5, wherein the duration of pulses in the second electric pulse signal have duration shorter than 0.3 ns.

* * * * *